(12) United States Patent
Webb

(10) Patent No.: US 6,384,954 B1
(45) Date of Patent: May 7, 2002

(54) OPTICAL MODULATOR

(75) Inventor: Steven Michael Webb, Kent (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/669,617

(22) Filed: Sep. 26, 2000

(30) Foreign Application Priority Data

Sep. 27, 1999 (GB) .............................................. 9922840

(51) Int. Cl.⁷ .............................. G02F 1/03; G02F 1/01
(52) U.S. Cl. ...................................... 359/245; 359/279
(58) Field of Search ................................. 359/245, 246, 359/279, 237, 238; 385/2

(56) References Cited

U.S. PATENT DOCUMENTS

| | | | | |
|---|---|---|---|---|
| 5,477,375 A | * | 12/1995 | Korotky | 359/264 |
| 5,621,560 A | * | 4/1997 | Wood | 359/161 |
| 5,745,613 A | * | 4/1998 | Fukuchi | 385/24 |
| 5,805,321 A | * | 9/1998 | Ooi | 359/135 |
| 5,917,638 A | | 6/1999 | Franck et al. | 359/181 |
| 5,953,138 A | * | 9/1999 | Ellis | 359/123 |
| 6,046,841 A | * | 4/2000 | Mahgerefteh | 359/326 |
| 6,236,488 B1 | * | 5/2001 | Shimizu | 359/187 |

FOREIGN PATENT DOCUMENTS

| | | |
|---|---|---|
| EP | 0 718 990 A2 | 6/1996 |
| WO | WO 96/13104 | 5/1996 |

OTHER PUBLICATIONS

Taga H et al. "Polarisation mode dispersion tolerance of 10 Gbit/s NRZ and RZ optical signals" Electronic Letters, IEE Stevenage, GB, vol. 34, No. 22 Oct. 29, 1998, pp. 2098–2100.

Lee H K et al. "All–fiber–optic clock recovery from non–return–to–zero format data" Electronics Letters, IEE Stevenage, GB, vol. 34, No. 5, Mar. 5, 1998, pp. 478–480.

Takayama K et al.: "An all–optical 10–GHZ LD–based clock regenerator using a mach–zehnder–interferometer–type NRZ–to–RZ converter" IOOC–ECOC. European Conference on Optical Communication ECOC. International Conference on Integrated Optics and Optical Fiber Communication IOOC, vol. 1, 1991, pp. 77–80.

* cited by examiner

Primary Examiner—Ricky Mack
Assistant Examiner—Gary O'Neill
(74) Attorney, Agent, or Firm—Sughrue Mion, PLLC

(57) ABSTRACT

An optical device is disclosed for the external modulation of the output 4 of an optical radiation source. The device includes a first optical modulator 2 driven by an NRZ coded electrical data signal 3 so as to modulate the output 4 of an optical radiation source. The device also includes a second optical modulator 6 coupled to the first optical modulator 1 and driven by one or more drive signal sources 7, 8 from electrical circuit 9. The circuit 9 drives modulator 6 so as to provide an optical AND function to convert the NRZ coded optical signal output the first optical modulator 1 into an RZ coded optical signal and to simultaneously introduce a degree of phase modulation (e.g. pre-chirp) in the RZ signals modulated thereby.

25 Claims, 2 Drawing Sheets

OPTICAL MODULATOR

BACKGROUND TO THE INVENTION

Optical transmission systems are generally based on one of two methods of modulation of a signal laser, either direct or external modulation. In the first of these, the bias current to the laser is modulated, turning the laser on and off. The disadvantage of this when applied to high capacity systems is that the semiconductor material dynamic behaviour introduces distortion into the laser output, known as chirp. External modulation of the continuous wave (CW) source produces a modulated output signal with significantly reduced chirp, and sources of this type are preferred for use in high capacity systems. High speed electrode-optic modulators such as Mach Zehnder devices are typically used.

One coding format for optical signals in fibre optic networks is non-return-to-zero (NRZ). In this format a coded data pulse fills the time slot corresponding to a bit period and if the next data bit has the same value no transition occurs at the end of the time slot. An example of a modulator which is designed to implement NRZ format transmission is the X2624C Mach Zehnder opto-electronic device available from Lucent. This is a dual electrode Mach Zehnder device which uses an electrical data stream and its inverse to drive respective electrodes, thereby gating (modulating) a CW source to provide NRZ optical data. By altering the two drive levels on the respective electrodes it is possible to affect a degree of pre-chirp (positive or negative) to compensate for non-linear transmission effects.

An alternative to NRZ coding is to use a return-to-zero (RZ) format. In this case, if the data in a time slot is a "1", the signal drops back to the "0" level before the end of the slot, whatever the value of the data in the next bit: a "1" is signified by the presence of a pulse located within the bit period. RZ format is more stable than NRZ coded optical signals at high bit rates, and is therefore preferred for high capacity long haul transmission systems.

One known arrangement for coding an RZ optical signal requires a first Mach Zehnder device to modulate a CW source using NRZ electrical data as the drive signal, the output of which is modulated by a second Mach Zehnder device configured as an optical AND gate to convert the NRZ optical input to an RZ optical signal at the output. The output of the second Mach Zehnder device is then coupled to a phase modulator to provide a degree of pre-chirp to compensate for non-linear transmission effects. It is not possible to provide an integrated package and therefore this solution is much more complex.

The latest 10 Gbit s$^{-1}$ WDM optical transmission systems that are being proposed for submarine networks will provide 60 or more channels with a spacing of only 0.4 nm. In future, 120 channels having a spacing of only 0.2 nm will be offered. One problem with the development of high capacity systems such as these is that the footprint of the terminals required to support the systems are becoming increasingly large at a time when customers are demanding ever smaller integrated solutions to their needs. The preferred RZ coding format for high bit rate systems and the associated optical devices described above required to generate an RZ coded signal from an NRZ electrical data stream makes this difficult to achieve.

SUMMARY OF THE INVENTION

According to a first aspect of the present invention, an optical device for the external modulation of the output of an optical source, comprises:

a first optical modulation device driven by an NRZ coded electrical data stream to modulate the output of the optical source to generate an NRZ coded optical signal; and, a second optical modulation device coupled to the output of the first optical modulation device and driven by one or more sources to implement an optical AND function and controllable to introduce a predetermined degree of phase modulation to thereby convert the NRZ coded optical signal from the first optical modulation device to a phase modulated RZ coded optical signal for subsequent transmission.

According to a second aspect of the present invention, an optical modulator comprises a dual electrode Mach Zehnder device driven by one or more sources to implement an optical AND function and thereby convert an NRZ coded optical signal at an input to an RZ coded optical signal at an output.

Preferably, the one or more sources comprise an electrical circuit for controlling the drive of electrodes of the dual electrode Mach Zehnder device to modulate the phase of the coded optical signal and thereby introduce a predetermined degree of pre-chirp to the RZ coded optical signal at the output.

BRIEF DESCRIPTION OF THE DRAWINGS

Examples of the present invention will now be described with reference to the accompanying drawings, in which.

DETAILED DESCRIPTION

Figure 1:
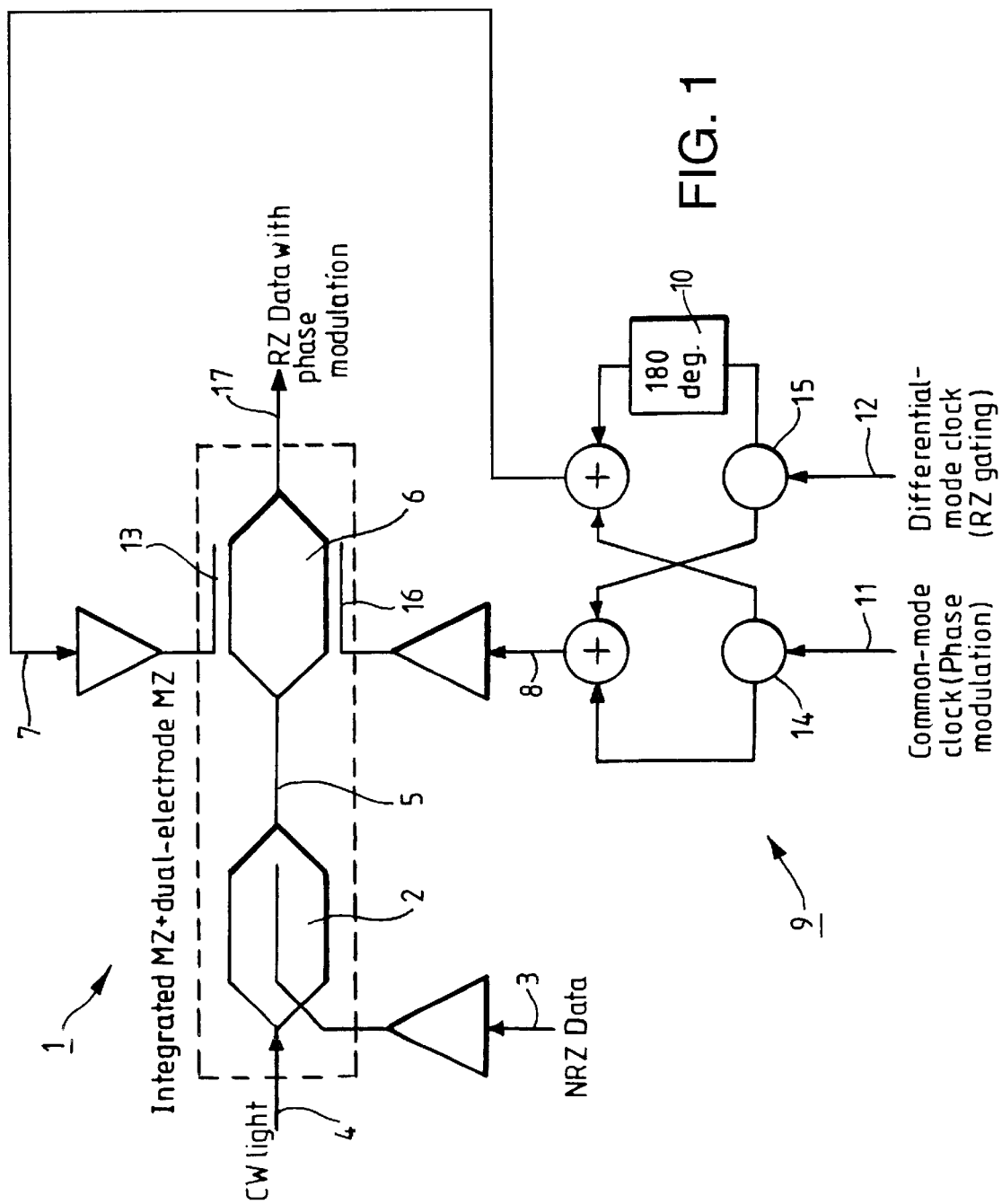
FIG. 1 shows a first example of an optical modulator in accordance with the present invention; and, FIG. 2 shows a second example of an optical modulator in accordance with the present invention.

FIG. 1 shows an example of an optical modulator 1 consisting of a pair of Mach Zehnder devices. A first Mach Zehnder device 2 is gated by an NRZ electrical data signal 3 to modulate an optical output 4 of a CW optical source (not shown) to generate an NRZ coded optical signal at an optical output 5. The NRZ coded optical signal output 5 is then coupled to the second of the two Mach Zehnder devices 6.

The second Mach Zehnder device 6 is a dual electrode device, in this example a 20 Gbit s$^{-1}$ X2624C available from Lucent, gated by signals 7 and 8, respectively, derived from an electrical summation circuit 9 having a phase shifter 10 and fed by a common mode clock signal 11 and a differential mode clock signal 12.

As shown, one electrode 13 of the dual electrode Mach Zehnder device 6 is gated by a signal 7 derived by summing the signal 11 from a common mode clock (not shown) coupled by a first splitter 14 with a differential mode clock signal 12 coupled by a second splitter 15 via the phase shifter 10. The other electrode 16 is gated by a simple summation of signals coupled from respective splitters 14 and 15 associated with the same clock sources. Each of the clock signals in this example is assumed to be derived from the clock used to drive the data. In this manner, the dual electrode Mach Zehnder 6 may be driven in such a way as to provide intensity modulation when the electrodes are driven anti-phase or phase modulation if both electrodes are driven in-phase. By applying suitable sinusoidal drive signals to each electrode, resultant in-phase and antiphase signals can be resolved, so the device simultaneously operates as both a phase and intensity modulator. For instance if both electrodes are driven in anti-phase with similar sinusoids then no phase modulation will occur, however if one electrode is driven with double the level and the other is inactive, then there will be phase modulation in addition to amplitude modulation. If the phase and amplitude of each of the clock signals 11 and 12 are varied it is possible to change the position and magnitude of the chirp, whilst independently controlling the Mach Zehnder drive signal level.

The second Mach Zehnder device 6 is driven to provide an optical AND function to convert the NRZ coded optical signal to an RZ coded optical signal with a controllable degree of phase modulation (pre-chirp) at an optical output 17. In use, the optical output 17 represents one channel in a high capacity WDM transmission signal. The two Mach Zehnder devices can be integrated on the same wafer and are therefore extremely space efficient.

Figure 2:
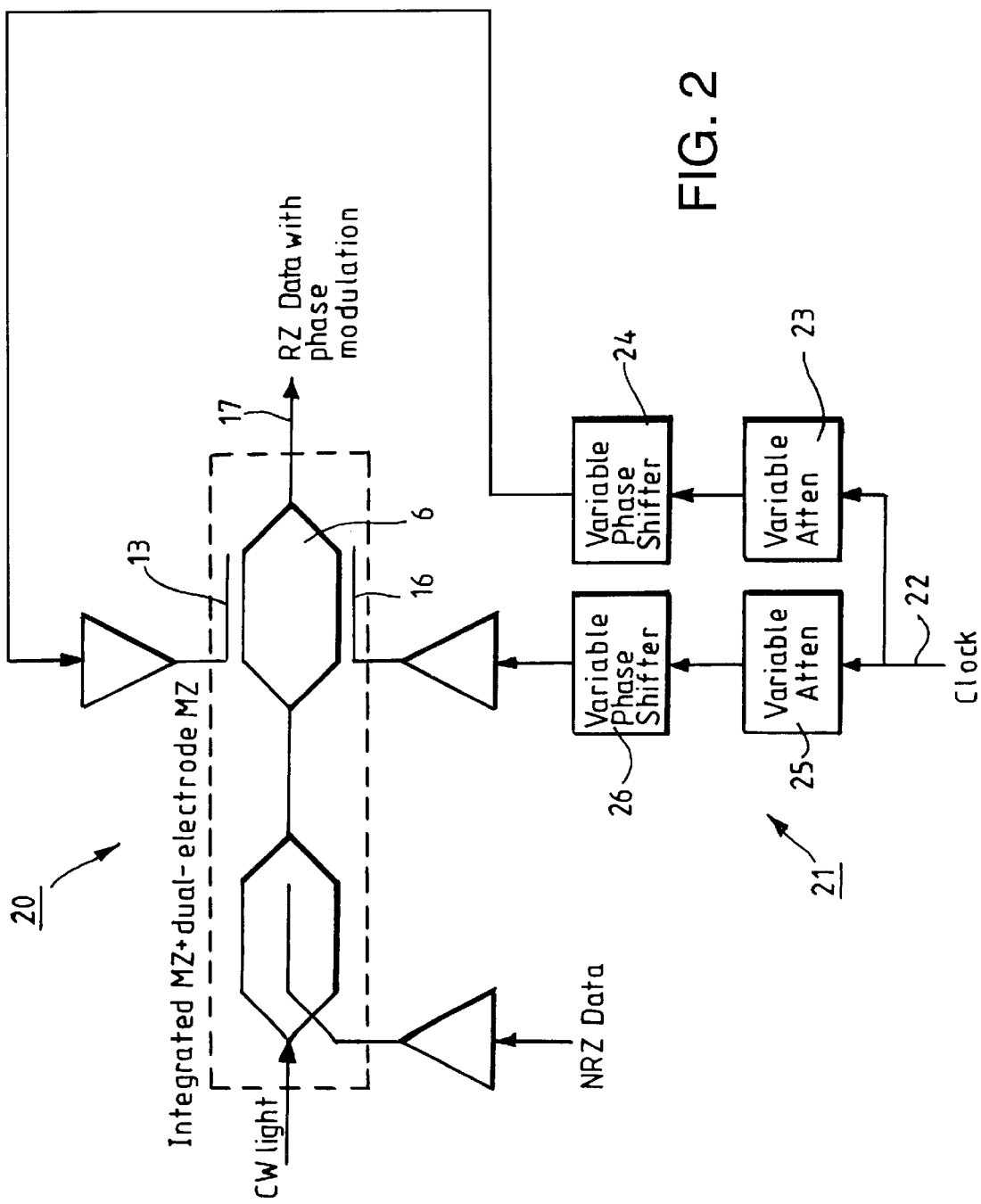

FIG. 2 shows another example of an optical modulator 20 which is similar to the example shown in FIG. 1, with the exception that a single fixed clock source (not shown) is used in the electrical drive circuit 21 for the dual electrode Mach Zehnder device 6.

In this example, the first electrode 13 is gated by a signal derived by passing a clock signal 22 through a first variable attenuation circuit 23 and then a first variable phase shifter circuit 24. Likewise, the second electrode 16 is gated by passing the clock signal 22 through a second variable attenuation circuit 25 and then a second variable phase shifter circuit 26. Once again, by applying suitable drive signals, the dual electrode device 6 can simultaneously operate as both a phase and intensity modulator to generate an RZ coded optical signal with a controllable degree of phase modulation (pre-chirp) at the optical output 17.

What is claimed is:

1. An optical device for the external modulation of the output of an optical source, comprising:
   a first optical modulation device driven by an NRZ coded electrical data stream to modulate the output of the optical source to gene-ate an NRZ coded optical signal; and,
   a second optical modulation device coupled to the output of the first optical modulation device and driven by one or more sources to implement an optical AND function and controllable to introduce a predetermined degree of phase modulation to thereby convert the NRZ coded optical signal from the first optical modulation device to a phase modulated RZ coded optical signal for subsequent transmission.

2. An optical device according to claim 1, in which the first optical modulation device is a Mach Zehnder device.

3. An optical device according to claim 1, in which the second optical modulation device is a dual electrode Mach Zehnder device.

4. An optical device according to claim 1, in which the first optical modulation device and the second optical modulation device are integrated.

5. An optical device according to claim 1, in which the one or more sources comprise an electrical circuit for controlling the drive of the second optical modulation device to modulate the phase of the coded optical signal and thereby introduce a predetermined degree of pre-chirp to the RZ coded optical signal at the output.

6. An optical device according to claim 5, in which the electrical circuit comprises a first splitter and a second splitter each driven by a respective clock signal, and a first summer and a second summer, wherein the first summer outputs a signal derived by summing the respective clock signals output by the first and second splitters and the second summer outputs a signal derived by summing one clock signal with a phase shifted version of the other.

7. An optical device according to claim 6, further comprising a phase shifter for introducing a predetermined phase shift in one of the clock signals.

8. An optical device according to claim 1, in which the electrical circuit comprises a clock source coupled to a first variable attenuation circuit and a first variable phase shifter circuit connected in series and also a second variable attenuation circuit and a second variable phase shifter circuit connected in series, to thereby provide two separate drive signals for the second optical modulation device.

9. An optical modulator comprising a dual electrode Mach Zehnder device driven by one or more sources to implement an optical AND function and thereby convert an NRZ coded optical signal at an input to an RZ coded optical signal at an output.

10. A device according to claim 9, in which the one or more sources comprise an electrical circuit for controlling the drive of electrodes of the dual electrode Mach Zehnder device to modulate the phase of the coded optical signal and thereby introduce a predetermined degree of pre-chirp to the RZ coded optical signal at the output.

11. An optical device, comprising:
    a first optical modulator that inputs a optical signal and a first modulation signal and modulates the optical signal based on the first modulation signal to produce an NRZ optical signal; and
    a second optical modulator that inputs the NRZ optical signal and at least a second modulation signal,
    wherein the second optical modulator modulates the NRZ optical signal based on the second modulation signal to produce an RZ optical signal.

12. The device as claimed in claim 11, wherein the first modulation signal is an electrical NRZ signal.

13. The device as claimed in claim 11, herein the second optical modulator inputs at least the second modulation signal and a third modulation signal and modulates the NRZ optical signal based on the second modulation signal and third modulation signal to produce the RZ optical signal.

14. The device as claimed in claim 11, wherein the RZ optical signal is a phase modulated RZ optical signal, and
    wherein the second optical modulator introduces a predetermined degree of phase modulation to the NRZ optical signal to produce the phase modulated RZ optical signal.

15. The device as claimed in claim 14, wherein the second optical modulator performs an optical AND function to generate the phase modulated RZ optical signal.

16. The device as claimed in claim 13, further comprising:
    a first adder circuit that inputs a first clock signal and a second clock signal and that adds the first clock signal and the second clock signal to produce the second modulation signal; and
    a second adder circuit that inputs the first clock signal and a third clock signal and that adds the first clock signal and the third clock signal to produce the third modulation signal,
    wherein the third clock signal has a phase that is shifted with respect to the second clock signal.

17. The device as claimed in claim 16, further comprising:
    a phase shifting circuit that inputs the second clock signal and shifts the phase of the second clock signal by a predetermined phase to produce the third clock signal.

18. The device as claimed in claim 17, wherein the predetermined phase is 180°.

19. The device as claimed in claim 13, further comprising:
   a first variable phase shifting circuit that inputs a first clock signal and shifts the phase of the first clock signal to produce the second modulation signal; and
   a second variable phase shifting circuit that inputs a second clock signal and shifts the phase of the second clock signal to produce the third modulation signal.

20. The device as claimed in claim 19, further comprising:
   a first variable attenuation circuit that inputs a third clock signal and attenuates the third clock signal to produce the first clock signal; and
   a second variable attenuation circuit that inputs the third clock signal and attenuates the third clock signal to produce the second clock signal.

21. The device as claimed in claim 11, wherein the first optical modulator comprises a first Mach Zehnder device.

22. The device as claimed in claim 11, wherein the second optical modulator comprises a Mach Zehnder device.

23. The device as claimed in claim 21, wherein the second optical modulator comprises a second Mach Zehnder device.

24. The device as claimed in claim 21, therein the second optical modulator comprises a dual electrode Mach Zehnder device.

25. The device as claimed in claim 13, wherein a first electrode of the dual electrode Mach Zehnder device inputs the second modulation signal and a second electrode of the dual electrode Mach Zehnder device inputs the third modulation signal.

* * * * *